July 6, 1948.  J. E. LUCAS  2,444,658
BALL JOINT RETAINER
Filed Jan. 9, 1947
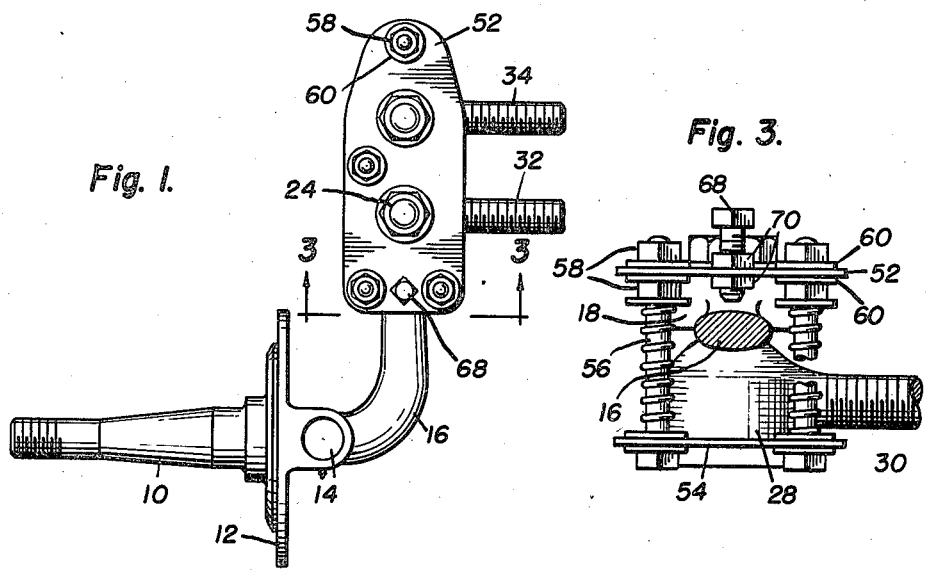
Fig. 1.
Fig. 3.
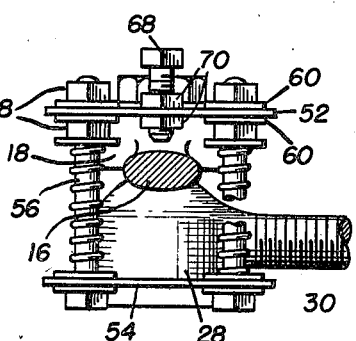
Fig. 2.
Fig. 4.
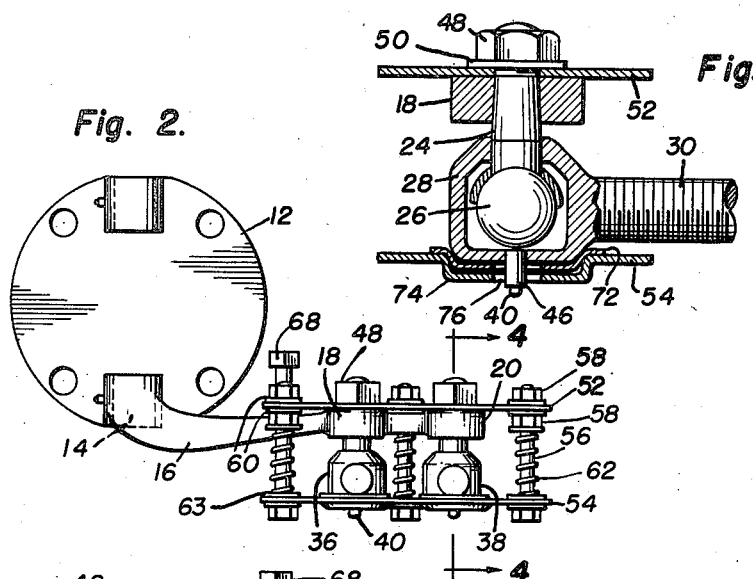
Fig. 5.
*Inventor*
Joseph E. Lucas
By 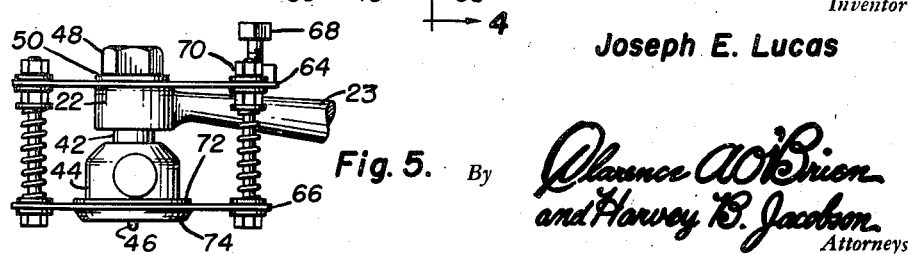
*Attorneys*

Patented July 6, 1948

2,444,658

UNITED STATES PATENT OFFICE 2,444,658

BALL JOINT RETAINER

Joseph E. Lucas, Longview, Tex., assignor of one-tenth to M. Neal Smith and M. Jones Porter, Gregg County, Tex.

Application January 9, 1947, Serial No. 721,097

5 Claims. (Cl. 287—90)

This invention relates generally to ball joint retainers, and more specifically to an improved means for retaining balls within the sockets in various forms of ball and socket joints, and especially adapted for use on such joints used for the pivotal attachment of the drag rod and tie rod in the steering apparatus of automobiles and trucks, the device functioning simultaneously as a safety ancillar fastening means, an anti-rattling device and an anti-wear device, inasmuch as the ball is tightly held in proper association with the socket with the foregoing ensuing benefits.

An object of this invention is, therefore, to provide a device whereby the steering apparatus of automobiles is safetied against uncoupling inadvertently during the operation of the vehicle, thus preventing accidents which would ensue almost certainly in the event of such uncoupling.

Another object of this invention is to provide an anti-rattling means when the device is applied to steering knuckles or like structures.

Another object of this invention is to provide against undue wear of the ball and socket members by virtue of the fact that the considerable portion of the wear of such structures is attributable to the friction and impact of the ball in the socket when undue relative movement between these members, other than the normal functional relative turning of the ball in the socket, is encountered as a result of the jarring of the mechanism, and the fact that this present invention mitigates or eliminates such undue vibration.

Another object of this invention is to provide a retainer for ball joints which is readily adjustable to compensate for the wear of said joints, a degree of adjustment being automatically achieved by springs, and major adjustments being made possible by the tightening of bolts holding the retainer on the joint.

Still another object of this invention is to provide a retainer of the character described which may be adjusted as to the position thereof relative to the structure supporting the socket member.

With these and other objects in view, as will appear hereinafter, this invention consists of certain novel features of construction, combination and arrangement of parts as will be hereinafter described in detail and particularly set forth in the appended claims, reference being had to the accompanying drawings which form a material part of this application, and in which:

Figure 1 is a top plan view of a front axle stub and steering arm assembly and threaded studs for the attachment of the drag rod and tie rod, with the subject matter of this present invention secured over the heads of these studs, that is, in operative position on these knuckles;

Figure 2 is a side elevational view of the same structure as that shown in Figure 1;

Figure 3 is a vertical sectional view taken on the line 3—3 in Figure 1, the steering arm being shown in section and the other portion of the figure being shown in elevation, and portions being broken away to conserve space and to amplify the illustration;

Figure 4 is an enlarged detailed vertical sectional view, taken on the line 4—4 in Figure 2, the view being designed to amplify the disclosure of the construction of the dished portion of the lower plate and the annular liner;

Figure 5 is an end view of a single socket structure with this invention applied thereto, the view corresponding with the double socket, the plan view of which is shown in Figure 1.

In the specification and in the drawings similar characters of reference designate similar or identical parts and portions throughout the several views.

Referring now to the drawings in detail, a stub axle 10 with an integral brake plate flange 12, an aperture for a king-pin 14 and a curved steering arm 16 terminates in two apertured swellings 18 and 20, all as indicated in Figures 1 and 2. All this structure has become more or less standardized in modern practice and it will, of course, be understood that the drawings have here represented apparatus for the front wheel suspension and steering in a pleasure automobile. This application makes no claim for novelty in the construction of these parts, nor in the construction of the single apertured swelling 22 representing a portion of the structure on the end of the tie rod 23 of such a vehicle. Standard procedure also is in the provision of a stud 24 ending in a ball 26, which ball is permanently secured within a socket member 28 manufactured according to various methods and usually formed integral with the end of a threaded stud such as those studs represented at 30 in Figures 3 and 4 of the drawings. Similar studs 32 and 34 are shown in Figure 1, these studs being adapted for the attachment of the drag bar and the tie rod respectively, the socket members 36 and 38 associated therewith being shown in Figure 2, and it should be noted that each of these sockets is equipped with a grease nipple 40. In the single unit shown in Figure 5, a stud 42 has the ball end thereof secured in a socket 44 with a terminal grease nipple 46, the ball-ended studs in each case being secured to corresponding members by nuts 48 associated with lock washers 50.

Two substantially similar plates 52 and 54, preferably constructed of flat sheet stock material of a thickness in the order of twelve gauge, are secured together on the opposite sides of the assembled joints, by a plurality of spaced bolts 56 and nuts 58 associated with lock washers 60.

These plates may be of generally rectangular form and tapered at one end and yieldably hold the socket portion in tight association with the ball end 26, helical springs 62 being secured on the bolts 56 and compressed between the two plates 52 and 54, washers 60 being provided at each end of each spring. The plates 64 and 66 adapted to be associated with single pivot unit such as represented in Figure 5 may be made considerably shorter than the plates 52 and 54, and only three bolts 56 are required corresponding to the five bolts associated with the larger plates for the double knuckles, and these smaller plates will assume a more nearly triangular form than rectangular.

At one end of the upper plates 52 and 64, a set screw 68, associated with lock nuts 70, best shown in Figure 3, is adapted to contact the upper surface of the supporting member 16, in this case the steering arm.

In order to provide for wear and to reinforce the lower plates 54 and 66, centrally apertured annular liners 72 are inserted between the end socket member such as that represented at 28 in Figure 4 and the lower plate 54 or 66. These liners are dished and the corresponding portions of the lower plates are similarly dished, as at 74, the dished portion of the plate also being apertured as at 76, allowing the insertion, through both registering apertures, of the grease nipple 46, this structure allowing access to said nipple for lubrication purposes, and to a limited extent utilizing this nipple as a locating member for the liner 72. Provided the proper adjustment of the said plates is maintained, the liners 72 will, however, remain properly positioned within the recessed portions 74 of the lower plates, and the grease nipple 46 will ordinarily have no second function.

With the foregoing description of the mechanical details of this present invention in view, the method of operation will be obvious, the device being automatic in its operation except for periodic adjustment effected by the adjustment of the set screw 68 and the nuts 58. It may be found advantageous or necessary to occasionally replace the liners 72 to the end that the lower plates 54 or 66 will not be exposed to wear. Obviously, the periodic lubrication of the knuckle will greatly lengthen the useful life thereof and the retainer described herein will not be required to overcome as great a degree of loosening of the knuckle as otherwise.

The advantages of this invention will be clearly understood and it should be noted that all of the objects recited above have been fully and amply attained.

Though there has been shown a particular embodiment of this invention, this application is not limited to this particular embodiment, but it is desired to include in the scope of this invention, construction, combination and arrangement of parts substantially as set forth in the appended claims.

Having thus described this invention, what is claimed as new and desired to be secured by Letters Patent is:

1. A retainer for ball joints having ball ended stud members secured within socket members on supporting structure, including a pair of substantially parallel flat plates secured together by a plurality of bolts with said members assembled and clamped therebetween, one of said plates having dished portions corresponding numerically and configuratively with the end portions of said socket members thereby positioning said plate relative thereto.

2. A retainer for ball joints having ball ended stud members secured with socket members on supporting structure, including a pair of substantially parallel flat plates secured together by a plurality of bolts with said members assembled and clamped therebetween, one of said plates having dished portions corresponding numerically and configuratively with the end portions of said socket members thereby positioning said plate relative thereto, and dished annular liners inserted between this plate and said end portions.

3. A retainer for ball joints having ball ended stud members secured with socket members on supporting structure, including a pair of substantially parallel flat plates secured together by a plurality of bolts with said members assembled and clamped therebetween, one of said plates having dished portions corresponding numerically and configuratively with the end portions of said socket members thereby positioning said plate relative thereto, and helical springs on said bolts compressed between said plates.

4. A retainer for ball joints having ball ended stud members secured within socket members on supporting structure, including a pair of substantially parallel flat plates secured together by a plurality of bolts with said members assembled and clamped therebetween, one of said plates having dished portions corresponding numerically and configuratively with the end portions of said socket members thereby positioning said plate relative thereto, said bolts being positioned to straddle a portion of said supporting structure to locate said plates relative thereto.

5. A retainer for ball joints having ball ended stud members secured within socket members on supporting structure, including a pair of substantially parallel flat plates secured together by a plurality of bolts with said members assembled and clamped therebetween, one of said plates having dished portions corresponding numerically and configuratively with the end portions of said socket members thereby positioning said plate relative thereto, and set screw adjustment means on one of said plates whereby one end of one of said plates can be variably spaced from said supporting structure.

JOSEPH E. LUCAS.

REFERENCES CITED

The following references are of record in the file of this patent:

UNITED STATES PATENTS

| Number | Name | Date |
| --- | --- | --- |
| 2,189,266 | Klages | Feb. 6, 1940 |